United States Patent [19]

McNulty

[11] Patent Number: 5,497,211
[45] Date of Patent: Mar. 5, 1996

[54] INDICIA DISPLAY DEVICE FOR EYEGLASSES OR THE LIKE

[76] Inventor: William J. McNulty, 527 E. Minor, Kansas City, Mo. 64131

[21] Appl. No.: 290,061

[22] Filed: Aug. 15, 1994

[51] Int. Cl.⁶ .................................................. G02C 11/02
[52] U.S. Cl. ............................................. 351/52; 351/158
[58] Field of Search ............................. 351/51, 52, 111,
351/158; 2/15, 10, 12, 13; D16/306–310,
336, 341, 342; D2/866, 868, 869, 895;
D11/165, 166, 168, 172, 181; 40/586

[56] References Cited

U.S. PATENT DOCUMENTS

| D. 283,268 | 4/1986 | Rebiskie et al. | D2/866 |
| D. 323,840 | 2/1992 | Jones et al. | D16/308 |
| 2,682,724 | 7/1954 | Pattillo | 351/51 X |
| 2,835,063 | 5/1958 | Worthington | 351/52 |
| 4,298,991 | 11/1981 | Recenello | 2/13 |
| 4,909,620 | 3/1990 | Saccone | 351/51 |
| 4,968,128 | 11/1990 | Mendola | 351/52 |
| 5,307,095 | 4/1994 | Ogura | 351/111 |

FOREIGN PATENT DOCUMENTS 0052494 11/1981 European Pat. Off. .
2692373 12/1993 France .................................... 351/47

Primary Examiner—William L. Sikes
Assistant Examiner—David R. Parsons
Attorney, Agent, or Firm—Litman, McMahon and Brown

[57] ABSTRACT

An indicia display device for eyeglasses or the like includes a display pennant, an elongated support and a fastener for coupling with an eyeglass templepiece. The pennant is mounted in upright position, atop the support and above and beyond the peripheral vision of the wearer. The fastener includes a pair of slots for accepting the templepiece of a pair of glasses and for permitting slidable movement of the device along the length of the templepiece until the pennant is correctly positioned.

The generally planar support provides an additional surface for display of indicia. In certain preferred forms, the device is of unitary construction with a pair of disposable sunglasses.

11 Claims, 1 Drawing Sheet

U.S. Patent        Mar. 5, 1996        5,497,211
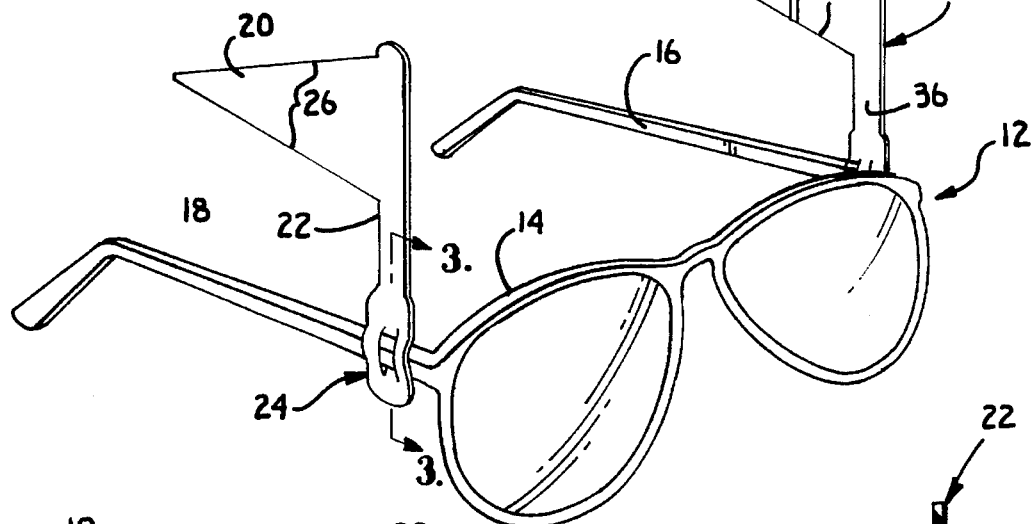
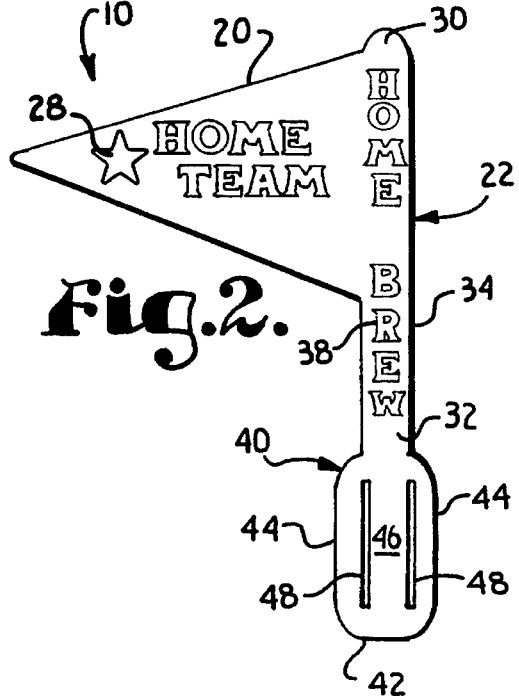
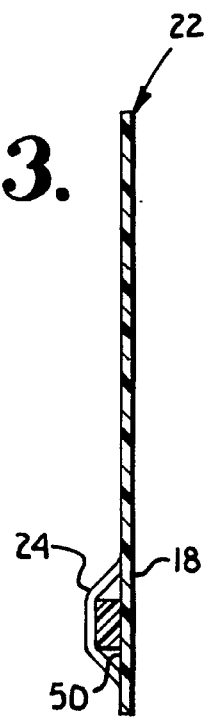

1

INDICIA DISPLAY DEVICE FOR EYEGLASSES OR THE LIKE

BACKGROUND OF THE INVENTION

1. Field of the Invention

The present invention is broadly concerned with an improved display device for use with eyeglasses or the like which is of economical construction and can be easily installed, adjustably positioned, and removed for flat storage. A device can be independently adjustably positioned on each of a pair of conventional eyeglass templepieces to provide spaces for display of indicia which are elevated above the glasses for easy visibility to observers but which do not impair the peripheral vision of the wearer. More particularly, it is concerned with an eyeglass pennant having a display surface, a support including a display surface, and a fastener for adjustably coupling the device with the templepiece of a pair of eyeglasses.

2. Description of the Related Art

Related art indicia display devices for eyeglasses are bulky, cumbersome, and cannot be adjusted to permit placement outside the peripheral vision of the wearer. Such devices present storage problems when not in use. Moreover, they are difficult to install, are not suited for use with goggles, masks and the like, and generally employ moving parts which are subject to breakdown.

SUMMARY OF THE INVENTION

The present invention overcomes the problems previously outlined and provides a greatly improved indicia display device for eyeglasses which is lightweight, easy to install, and provides a display surface which can be adjustably positioned beyond the peripheral vision of the wearer.

Broadly speaking, the device includes a display pennant, an elongated support and a fastener integral with the support for coupling with an eyeglass templepiece. Preferably, the pennant is mounted atop the upright support, above and beyond the peripheral vision of a wearer. The fastener includes a pair of slots for accepting the templepiece of a pair of eyeglasses and for permitting slidable movement of the device along the length of the templepiece until the pennant is correctly positioned.

In particularly preferred forms the device is of unitary construction and the support provides an additional surface for display of indicia. In still other preferred forms, the device is of unitary construction with a pair of disposable sunglasses.

OBJECTS AND ADVANTAGES OF THE INVENTION

The principal objects and advantages of the present invention include: providing an indicia display device which can be easily mounted on a pair of conventional eyeglasses, a pair of goggles, a mask or the like; providing such a device which does not impede the peripheral vision of a wearer; providing such a device which can be adjustably positioned along the length of each of the templepieces of a pair of eyeglasses; providing such a device on which indicia are easily visible to an observer; providing such a device which is simple and economical to construct; providing such a device which is particularly well-adapted to flat storage; providing such a device which is of unitary construction; and providing such a device which includes interchangeable pennants; providing such a device which is particularly well adapted to display two distinguishable indicia or messages; providing such a device which can be of unitary construction with a pair of disposable sunglasses.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an indicia display device in accordance with the present invention installed on a pair of conventional eyeglasses;

FIG. 2 is a plan view of the device of FIG. 1; and

FIG. 3 is a cross section taken along line 3—3 of FIG. 1.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawing, an indicia display device 10 in accordance with the invention is shown in use with a pair of eyeglasses 12. Those skilled in the art will appreciate that the display device of the invention may be embodied in connection with any of a number of other forms of eyewear, such as sunglasses, goggles, face masks or the like.

Eyeglasses 12, illustrated in FIG. 1, include a front portion 14, and left and right templepieces 16, 18. The indicia display device 10 broadly includes a pennant 20, support member 22, and fastener 24.

Pennant 20 includes a planar surface 26 for display of indicia 28. Pennant 20 is generally triangular in shape, although other suitable planar geometrical shapes may be employed.

Support member 22 is generally elongate, preferably rectangular, having a top end 30, a bottom end 32, and a body 34. Body 34 includes a planar surface 36 for display of indicia 38. Pennant 20 is coupled with support member body 34 adjacent top end 30. In other preferred embodiments, body 34 may be of a cylindrical or other solid geometrical shape. In still other embodiments, pennant 20 may be adjustably positioned along the length of support member 22.

Fastener 24 is generally rectangular in shape, having a top 40, a bottom 42, and a pair of sides 44. Fastener 24 presents a planar surface 46 having a pair of spaced, longitudinally oriented elongate slots 48. As best shown in FIG. 3, the portion of planar surface 46 between slots 48 may be displaced to a parallel plane to form a channel 50 therebetween for accepting an eyeglass templepiece.

All components are of economical construction, which is especially advantageous for souvenir use. Pennant 20 and support member 22 may be constructed of synthetic resin, paper, metal or any other suitable material. Fastener 24 may be constructed of any suitable material which is flexible or capable of being displaced to form channel 50 to accommodate a templepiece. In preferred embodiments, support member 22 and fastener 24 are of unitary construction. In especially preferred embodiments the entire device 10 is of unitary construction and may be stamped or cut from a single workpiece. In other preferred embodiments, the device 10 is of unitary construction with disposable sunglasses.

Pennant 20 may be removable for interchange with pennants displaying other indicia, or it may be of unitary construction with the support member. Where the pennant is removable, it may be constructed of a different material than the support member and fastener and may be attached to support member 22 with glue or the like. In such embodiments, pennant 20 and fastener slots 48 cooperatively permit adjustable positioning of the pennant above and beyond the peripheral vision of a wearer.

Separate indicia 28, 38 may be displayed on pennant 20 and support member 22, and they may be applied in any suitable manner, such as printing, painting, dyeing, or decals. The indicia may also be integrally formed, as with synthetic resin or embossing.

In operation, a user grasps the device 10 and depresses the planar surface between slots 48 to form channel 50. The user then inserts an eyeglass templepiece into the channel, orienting the device so that support member 22 projects generally perpendicularly upwardly from the templepiece and the indicia 28, 38 are displayed outwardly, away from the wearer. The device is slid along the templepiece toward eyeglass front portion 14 until it is positioned above and beyond the peripheral vision of the wearer. Advantageously, two of the devices may be mounted on a single pair of glasses, goggles or the like and each device may be independently positioned. In this manner, the device can be positioned to provide for maximum visibility to others without impediment to the vision of the wearer. Those skilled in the art will appreciate that the strap of a pair of goggles or a mask may be substituted for templepieces 16, 18.

Following use, the device need not be removed and will not impair folding of eyeglasses 12 for storage. Alternatively, the device may be removed by reversing the preceding procedure and may be stored flat.

It is to be understood that while certain forms of the present invention have been illustrated and described herein, it is not to be limited to the specific forms or arrangement of parts described and shown.

What is claimed and desired to be secured by Letters Patent is as follows:

1. An indicia display device for use with eyeglasses, goggles, a mask or the like having a frontal lens-holding portion and a pair of templepieces, comprising:

(a) an indicia display member;

(b) a fastener slidably coupled with one of said templepieces; and (c) an elongate support member intercoupling said display member and said fastener in spaced relationship, wherein said support member further includes a planar surface for display of indicia.

2. The indicia display device as set forth in claim 1, wherein said indicia display member is pennant shaped.

3. The indicia display device as set forth in claim 1, wherein said indicia display member may be removed and replaced.

4. The indicia display device as set forth in claim 1, wherein said fastener further comprises a generally planar structure having a pair of parallel slots for slidably accepting one of said templepieces therebetween and permitting adjustable positioning of said device along said templepiece.

5. The indicia display device as set forth in claim 1, wherein said support member and said fastener are of unitary construction.

6. The indicia display device as set forth in claim 1, wherein said indicia display member, said support member, and said fastener are of unitary construction.

7. An indicia display device of unitary construction for use with eyeglasses, goggles, a mask or the like having a frontal lens-holding portion and a pair of templepieces, comprising:

(a) a generally triangular indicia display member;

(b) an elongate, generally planar support member having a first end, a second end, and a planar indicia display surface therebetween, said first end being coupled with said display member;

(c) a generally planar fastener for adjustably coupling said support member second end to one of said templepieces in a generally upright orientation; and (d) wherein said fastener includes a pair of parallel slots for slidably accepting said templepiece therebetween and permitting adjustable positioning of said device along said templepiece and outside the peripheral vision of a wearer.

8. A combination eyeglass, indicia display device having a frontal lens-holding portion and a pair of templepieces, comprising (a) an indicia display member;

(b) a fastener slidably coupled with one of said templepieces; and (c) an elongate support member intercoupling said display member and said fastener in spaced relationship, wherein said support member further includes a planar surface for display of indicia.

9. The indicia display device as set forth in claim 8, wherein said indicia display member is pennant shaped.

10. The indicia display device as set forth in claim 8, wherein said indicia display member may be removed and replaced.

11. The indicia display device as set forth in claim 8, wherein said fastener further includes a generally planar member having a pair of parallel slots for slidably accepting one of said templepieces therebetween and permitting adjustable positioning of said device along said templepiece.

\* \* \* \* \*